US008627439B2

(12) United States Patent
Laasik

(10) Patent No.: US 8,627,439 B2
(45) Date of Patent: Jan. 7, 2014

(54) PROCESSING COMMUNICATION EVENTS IN A COMMUNICATIONS SYSTEM

(75) Inventor: Marek Laasik, Tallinn (EE)

(73) Assignee: Microsoft Corporation, Redmond, WA (US)

(*) Notice: Subject to any disclaimer, the term of this patent is extended or adjusted under 35 U.S.C. 154(b) by 411 days.

(21) Appl. No.: 12/462,204

(22) Filed: Jul. 30, 2009

(65) Prior Publication Data

US 2010/0293609 A1 Nov. 18, 2010

(30) Foreign Application Priority Data

May 13, 2009 (GB) .................................. 0908229.8

(51) Int. Cl.
*H04L 29/06* (2006.01)
(52) U.S. Cl.
USPC .............. 726/10; 726/1; 726/2; 726/3; 726/4; 726/7; 726/8; 726/9; 726/16; 726/17; 726/19; 726/20; 726/21; 726/26; 726/27; 726/28; 726/29; 726/30; 713/168; 713/169; 713/170; 713/173; 713/175; 713/182; 713/185; 370/259; 370/260; 370/271
(58) Field of Classification Search
USPC ....................... 726/2–4, 16–21, 26–33, 7–10; 713/168–186; 370/259–271
See application file for complete search history.

(56) References Cited

U.S. PATENT DOCUMENTS

| 5,794,142 | A * | 8/1998 | Vanttila et al. ................. 455/419 |
| 7,412,598 | B1 * | 8/2008 | Gleichauf ....................... 713/155 |
| RE42,694 | E * | 9/2011 | Coffee ....................... 379/201.12 |
| 2003/0123593 | A1 * | 7/2003 | Creamer et al. ............... 375/368 |
| 2005/0081042 | A1 * | 4/2005 | Venkatesan et al. ........... 713/176 |
| 2007/0153770 | A1 * | 7/2007 | Goyal et al. ................... 370/352 |
| 2008/0056237 | A1 * | 3/2008 | Bresemann .................... 370/352 |
| 2009/0248883 | A1 * | 10/2009 | Suryanarayana et al. ..... 709/229 |
| 2010/0057674 | A1 * | 3/2010 | O'Donnell ......................... 707/3 |

FOREIGN PATENT DOCUMENTS

EP 1 758 041 A1 2/2007
WO WO 2005/009019 A2 1/2005

OTHER PUBLICATIONS

Search Report and Examination Report from Great Britain Application No. GB0908229.8 Dated Sep. 9, 2010.

* cited by examiner

*Primary Examiner* — Madhuri Herzog
(74) *Attorney, Agent, or Firm* — Wolfe-SBMC

(57) ABSTRACT

A method of communicating over a communications system includes determining that a communication event at a user terminal of the communications system requires use of a feature for processing data, the communication event being over the communications system and determining that the feature required by the communication event is not enabled for use at the user terminal when the communication event is initiated. Following the step of determining that the feature is not enabled, the method further includes retrieving a certificate enabling the use of the feature at the user terminal and using the feature at the user terminal to process data of the communication event.

19 Claims, 5 Drawing Sheets

PROCESSING COMMUNICATION EVENTS IN A COMMUNICATIONS SYSTEM

RELATED APPLICATION

This application claims priority under 35 U.S.C. §119 or 365 to Great Britain, Application No. 0908229.8, filed May 13, 2009. The entire teachings of the above application are incorporated herein by reference.

TECHNICAL FIELD

This invention relates to processing communication events in a communications system.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), voicemail and file transfer.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a central server but directly from end-user to end-user. Further details on such a P2P system are disclosed in WO 2005/009019.

Communication events that occur at a user terminal in the communication system, such as receiving an incoming call or placing an outgoing call, may require certain features to be enabled and activated for use at the user terminal in order for the communication event to be processed correctly at the user terminal. For example, a particular version of a codec may be required at the user terminal in order to encode and/or decode data of the communication event in an optimal manner.

Software that includes a required feature can be installed on the user terminal, or on a server accessible by the user terminal. Software providers often require that the software is authenticated for use at the user terminal, for reasons such as preventing or reducing illegal copying of the software. This also allows the software provider to control the distribution and use of the software. The user of the user terminal is required to provide an identification, such as a product key, to the software provider in order to activate and enable the software for use on the user terminal. The software provider issues a certificate to the user terminal which allows the activation and enablement of the software for use on the user terminal. The software provider can control the number of certificates that are issued for a particular identification (or product key).

If the user has not authorised the software for use on the user terminal then he cannot use the software on the user terminal. Therefore, if a communication event occurs that requires the use of a feature to process data pertaining to the communication event, then that feature cannot be used, which can result in failure or degradation of the communication event.

SUMMARY

In a first aspect of the invention there is provided a method of communicating over a communications system, the method comprising: determining that a communication event at a user terminal of the communications system requires use of a feature for processing data, the communication event being over the communications system; determining that the feature required by the communication event is not enabled for use at the user terminal when the communication event is initiated; following said step of determining that the feature is not enabled, retrieving a certificate enabling the use of the feature at the user terminal; and using the feature at the user terminal to process data of the communication event.

The step of retrieving a certificate may comprise: transmitting a request to enable the use of the feature at the user terminal, over the communications system, to a node of the communications system; determining, at the node, based on data contained in the request, whether the use of the feature at the user terminal is authorized; if the use of the feature at the user terminal is authorized, transmitting the certificate to the user terminal over the communications system.

Alternatively, the step of retrieving a certificate may comprise retrieving the certificate from a memory of the user terminal. The memory may provide for permanent storage of data on the user terminal. Alternatively, the memory may provide for temporary storage of data on the user terminal.

In a second aspect of the invention there is provided a communications system comprising a user terminal, the user terminal comprising: means for determining that a communication event at the user terminal requires use of a feature for processing data, the communication event being over the communications system; means for determining that the feature required by the communication event is not enabled for use at the user terminal when the communication event is initiated; means for retrieving a certificate enabling the use of the feature at the user terminal; and means for using the feature at the user terminal to process data of the communication event.

When a communication event at a user terminal requires the use of a feature to process data of the communication event, where the feature is not enabled for use at the user terminal, the user terminal can automatically authenticate and enable the feature for use at the user terminal for processing data of the communication event. In this way, if a user has not yet authenticated the software including the required feature, the feature can be automatically authenticated and enabled as and when it is needed in a communication event. This results in a better performance of the communication event from the user's perspective (since the required features can be used).

In order to enable the feature at the user terminal, the user terminal requires a certificate to authenticate the feature for use at the user terminal. The certificate may be stored in configuration files in the memory of the user terminal, but if not, the user terminal will attempt to retrieve the certificate from a Call Triggered Activation (CTA) service of the communications system. The CTA service will only issue the certificate to activate the feature if use of the feature is permitted on the device for the user.

Software installed on the user terminal, or on a central server of the communications system, may contain many features. In some systems in which the user provides an identification to the software provider to enable the software, all of the features of the software will be enabled at once. Since the present invention does not require involvement of the user, individual features can be enabled automatically at the user terminal when required in communication events such that use of the individual features in the software can be controlled on a per device basis or on a per user basis. This allows the software provider to control the activation of features in the software with greater flexibility. It also allows the software provider to track the use of features in the communications system for the purposes of billing, and to see how popular the individual features are. A user may also allocate features for which payment is required to particular devices at different times, by activating the feature temporarily.

BRIEF DESCRIPTION OF THE DRAWINGS

For a better understanding of the present invention and to show how the same may be put into effect, reference will now be made, by way of example, to the following drawings in which.

DETAILED DESCRIPTION OF THE INVENTION

Figure 1:
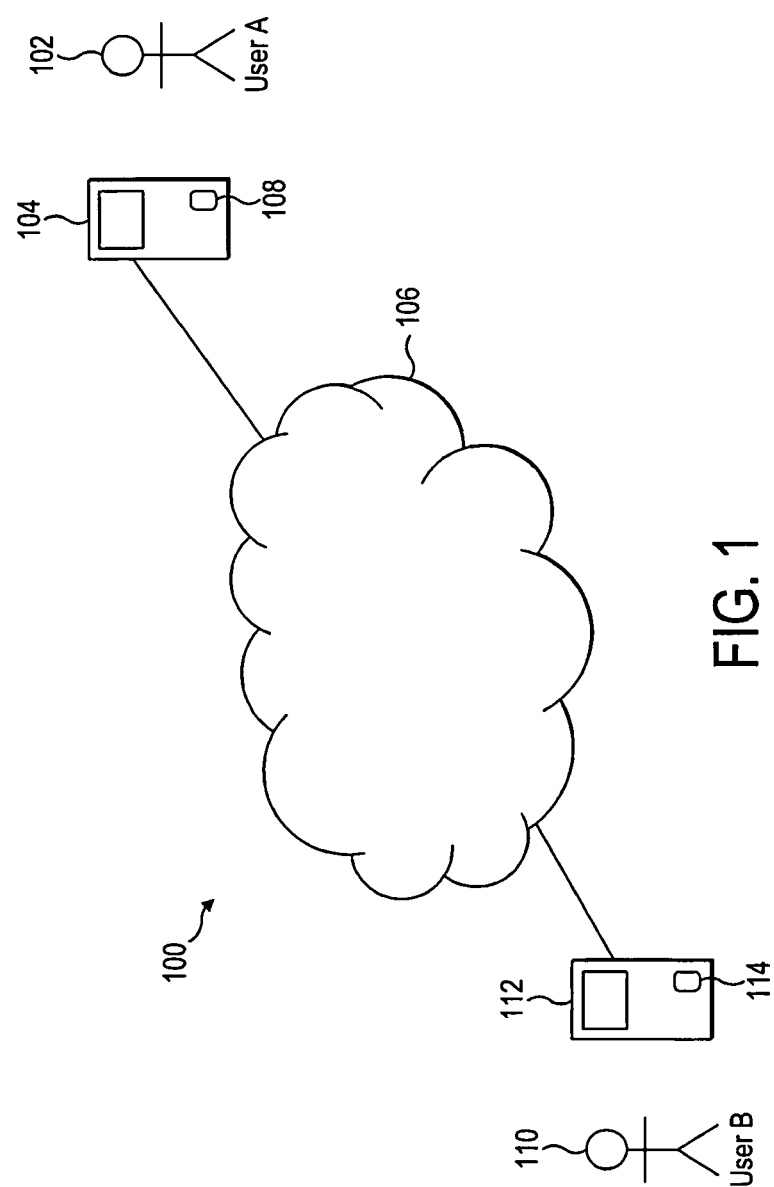
FIG. 1 shows a packet-based communication system.

Reference is first made to FIG. 1, which illustrates a packet-based P2P communication system 100. A first user of the communication system (User A 102) operates a user terminal 104, which is shown connected to a network 106. Note that the communication system 100 utilises a network such as the Internet. The user terminal 104 may be, for example, a mobile phone, a personal digital assistant ("PDA"), a personal computer ("PC") (including, for example, Windows™, Mac OS™ and Linux™ PCs), a gaming device or other embedded device able to connect to the network 106. The user device 104 is arranged to receive information from and output information to a user 102 of the device. In a preferred embodiment the user device 104 comprises a display such as a screen and an input device such as a keypad, joystick, touch-screen, keyboard and/or mouse. The user device 104 is connected to the network 106.

Note that in alternative embodiments, the user terminal 104 can connect to the communication network 106 via additional intermediate networks not shown in FIG. 1. For example, if the user terminal 104 is a mobile device, then it can connect to the communication network 106 via a cellular mobile network (not shown in FIG. 1), for example a GSM or UMTS network.

The user terminal 104 is running a communication client 108, provided by the software provider. The communication client 108 is a software program executed on a local processor in the user terminal 104.

Figure 2:
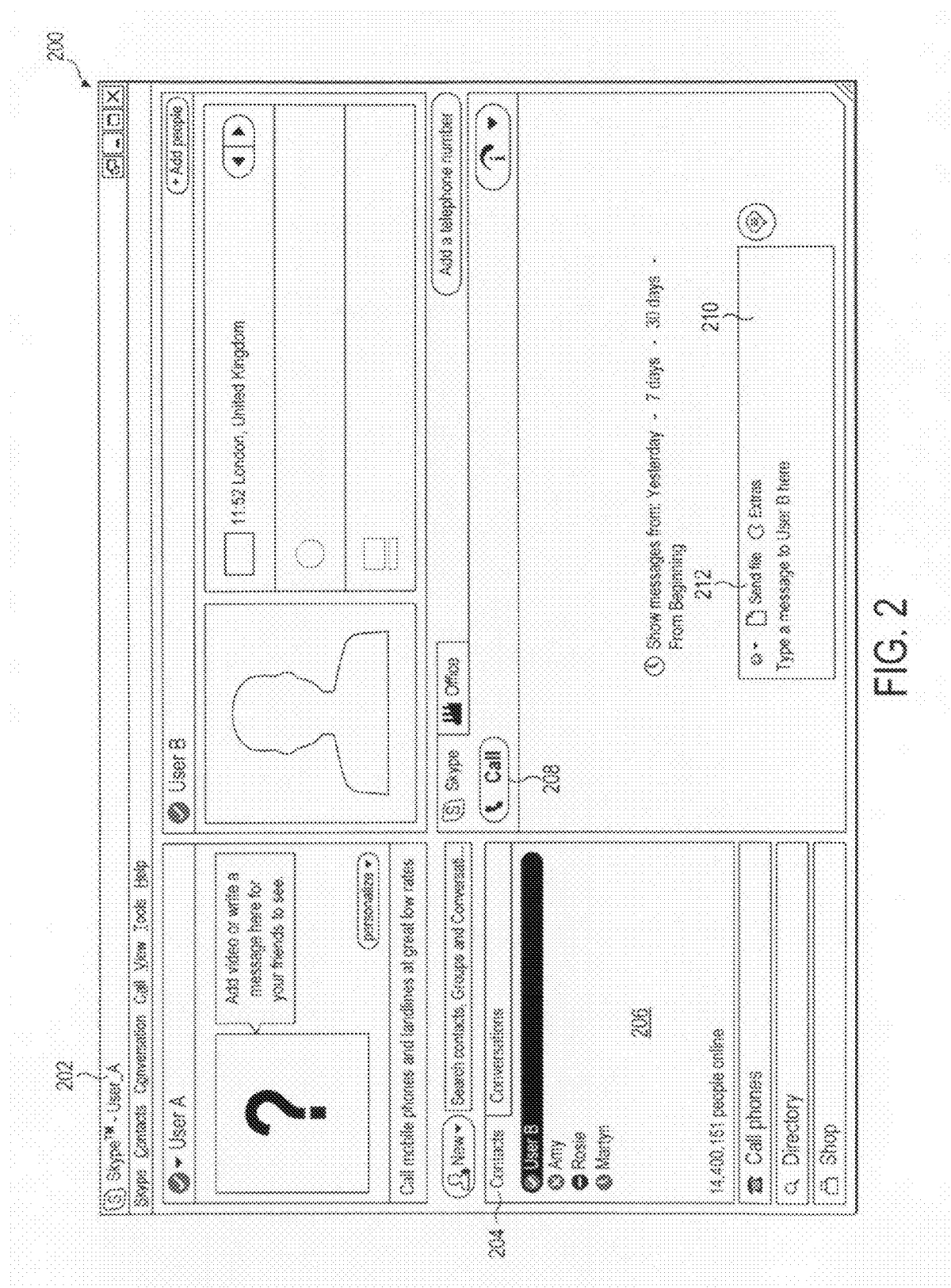
FIG. 2 shows a user interface of a communication client.

An example of a user interface 200 of the communication client 108 executed on the user terminal 104 of the first user 102 is shown illustrated in FIG. 2. Note that the user interface 200 can be different depending on the type of user terminal 104. For example, the user interface can be smaller or display information differently on a mobile device, due to the small screen size. In the example of FIG. 2, the client user interface 200 displays the username 202 "User_A" of User A 102 in the communication system.

The client user interface 200 comprises a tab 204 labelled "contacts", and when this tab is selected the contacts of User A are displayed in a pane 206 below the tab 204. In the example user interface shown in FIG. 2, four other users of the communication system are shown as contacts of User A listed in pane 206. Each of these contacts have authorised User A 102 of the client 108 to view their contact details.

VoIP calls to the contacts displayed in pane 206 may be initiated over the communication system by selecting the contact and clicking on a "call" button 208 using a pointing device such as a joystick or a mouse. Referring again to FIG. 1, the call set-up is performed using proprietary protocols, and the route over the network 106 between the calling user and called user is determined by the peer-to-peer system without the use of servers. For example, the User A 102 can call User B 110.

Following authentication through the presentation of digital certificates (to prove that the users are genuine subscribers of the communication system—described in more detail in WO 2005/009019), the call can be made using VoIP. The client 108 performs the encoding and decoding of VoIP packets. VoIP packets from the user terminal 104 are transmitted into the network 106, and routed to a user terminal 112 of the called party 110. A client 114 (similar to the client 108) running on the user terminal 112 of the called user 110 decodes the VoIP packets to produce an audio signal that can be heard by the called user through a speaker of user terminal 112. Conversely, when the second user 110 talks into a microphone of the user terminal 112, the client 114 executed on user terminal 112 encodes the audio signals into VoIP packets and transmits them across the network 106 to the user terminal 104. The client 108 executed on user terminal 104 decodes the VoIP packets, and produces an audio signal that can be heard by the user of the user terminal 104 through a speaker of the user terminal 104.

The VoIP packets for calls between users (such as 102 and 110) as described above are passed across the network 106 only, without involving other networks, such as a public switched telephone network. Furthermore, due to the P2P nature of the system, the actual voice calls between users of the communication system can be made with no central servers being used. This has the advantages that the network scales easily and maintains a high voice quality, and the call can be made free to the users. Additionally, calls can also be made from the client (108, 114) using the packet-based communication system to fixed-line or mobile telephones, by routing the call to a PSTN network (not shown in FIG. 1) connected to the P2P network 106. Similarly, calls from fixed-line or mobile telephones can be made to the packet-based communication system via a PSTN network (not shown in FIG. 1) connected to the P2P network 106.

In addition to making voice calls, the user of the client 108 can also communicate with the contacts listed in pane 206 in several other ways. For example, an instant message (also known as a chat message) can be sent by typing a message in box 210 (as shown in FIG. 2) using a keyboard (or keypad) and pressing "enter" on the keyboard (or keypad). The first user 102 can also use the client 108 to transmit files to his contacts using the "send file" button 212. Additionally, the user can use the client 108 to send voicemails to the contacts or establish video calls with the contacts (not illustrated in FIG. 2).

Figure 3:
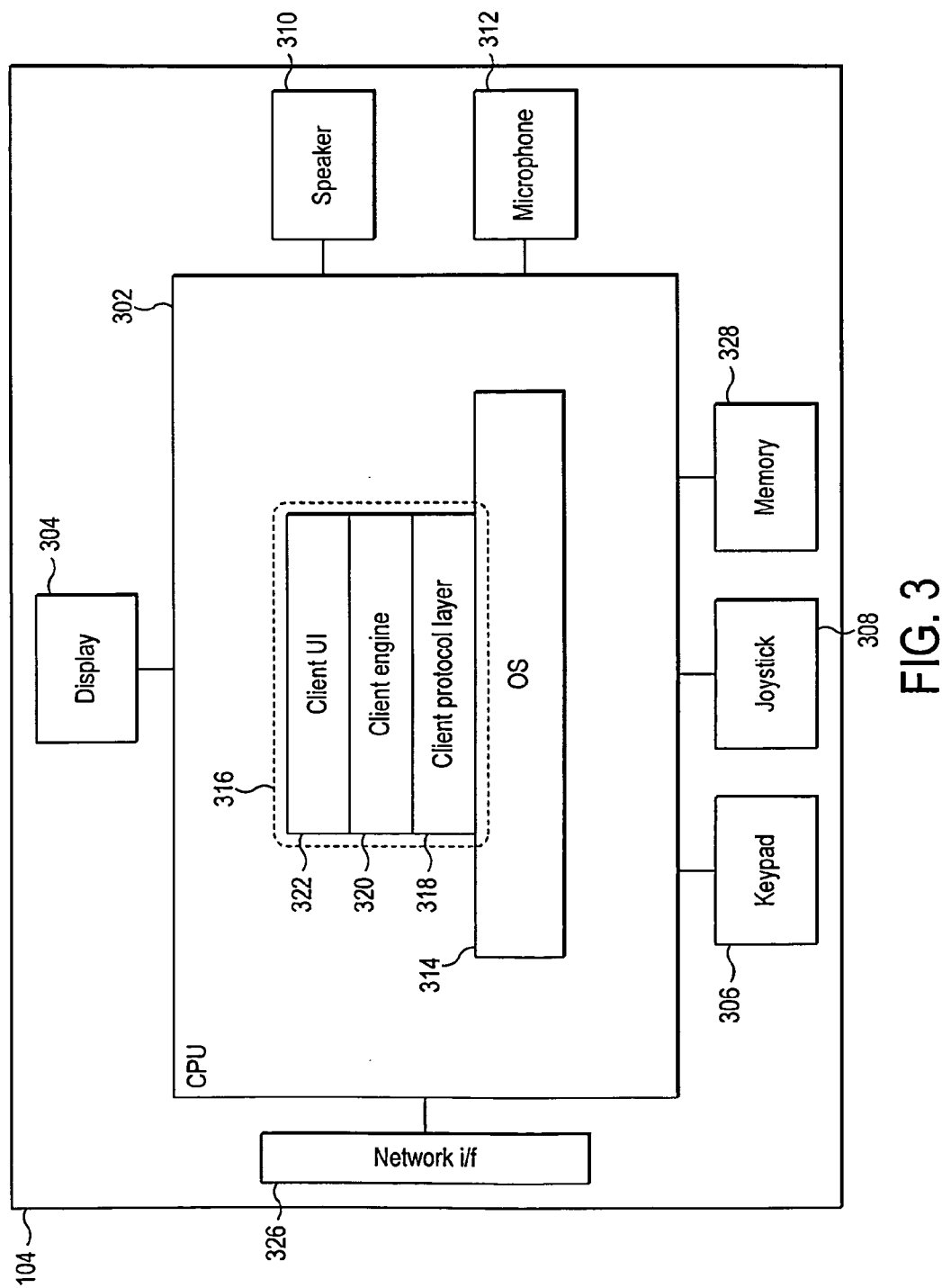
FIG. 3 shows a user terminal executing a communication client.

FIG. 3 illustrates a detailed view of the user terminal 104 on which is executed client 108. The user terminal 104 comprises a central processing unit ("CPU") 302, to which is connected a display 304 such as a screen, input devices such as a keypad (or a keyboard) 306 and a pointing device such as a joystick 308. The display 304 may comprise a touch screen for inputting data to the CPU 302. An output audio device 310 (e.g. a speaker) and an input audio device 312 (e.g. a microphone) are connected to the CPU 302. The display 304, keypad 306, joystick 308, output audio device 310 and input audio device 312 are integrated into the user terminal 104. In alternative user terminals one or more of the display 304, the keypad 306, the joystick 308, the output audio device 310 and the input audio device 312 are not integrated into the user terminal 104 and are connected to the CPU 302 via respective interfaces. One example of such an interface is a USB interface. A pointing device such as a mouse (not shown) may be connected to the CPU 302 via an interface (not shown), which may be a wired interface or a wireless interface. The CPU 302 is connected to a network interface 326 such as a modem for communication with the network 106. The network interface 326 may be integrated into the user terminal 104 as shown in FIG. 3. In alternative user terminals the network interface 326 is not integrated into the user terminal 104.

FIG. 3 also illustrates an operating system ("OS") 314 executed on the CPU 302. Running on top of the OS 314 is a software stack 316 for the client 108. The software stack shows a client protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 326. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Figure 4:
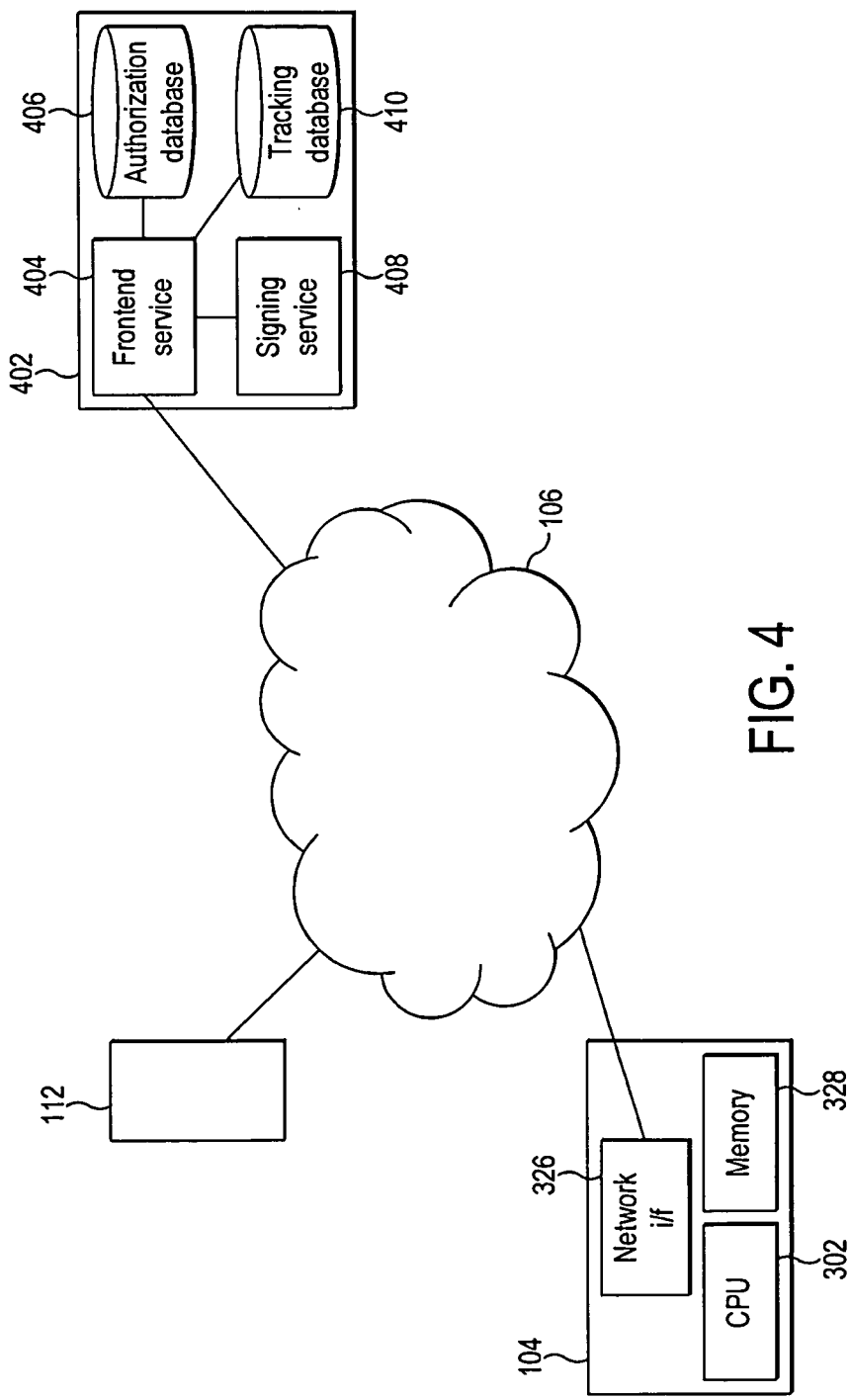
FIG. 4 is a schematic diagram of a communication system according to a preferred embodiment.
Figure 5:
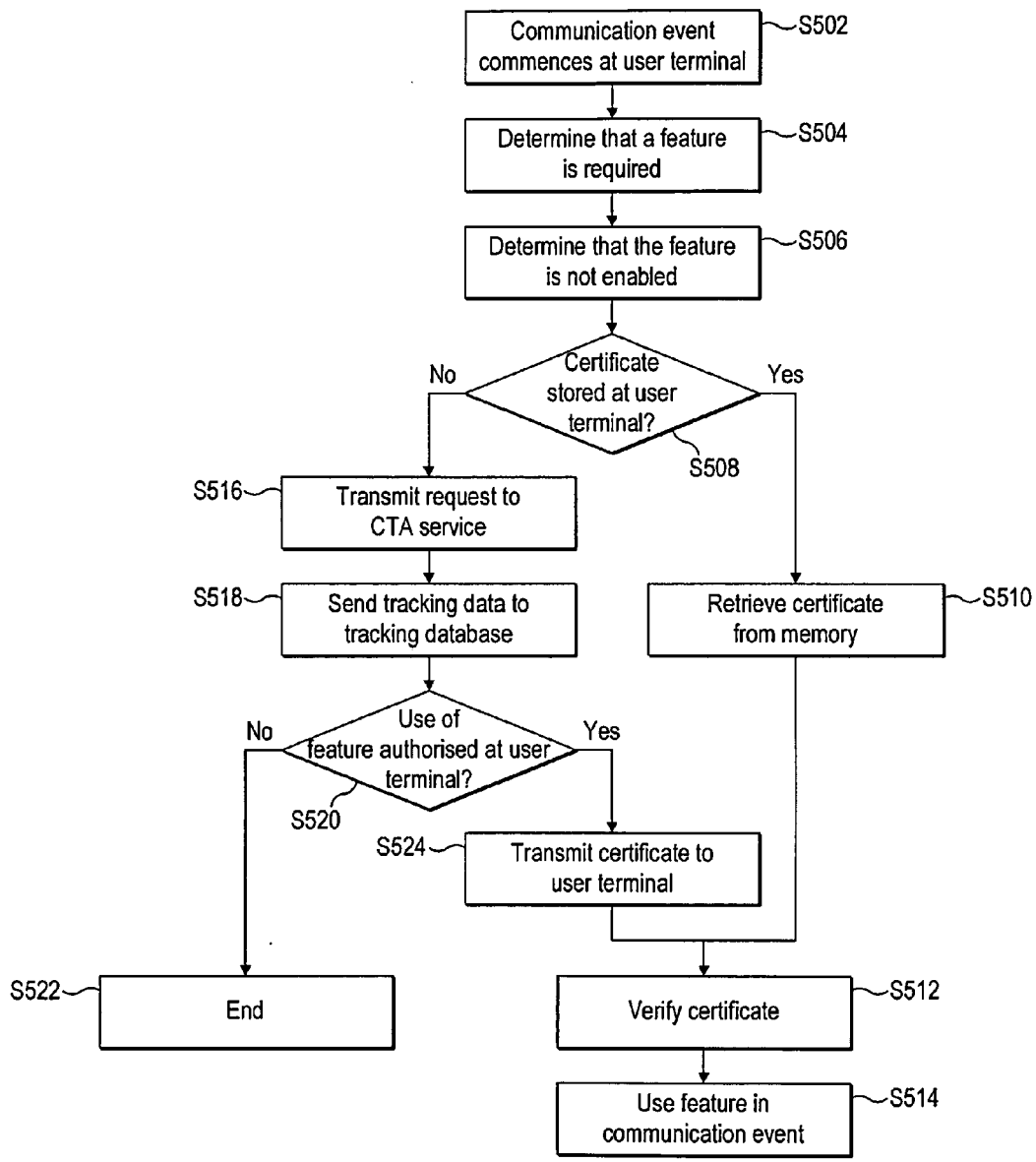
FIG. 5 shows a flowchart of a process for enabling and using a feature in a communication event.

The user terminal 104 also includes a memory 328 for storing data. For example, software including features which can be used at the user terminal that has been installed at the user terminal 104 is stored in the memory 328. Certificates may be required to enable the use of certain features at the user terminal 104. These certificates may be stored in the memory 328, for example in relevant configuration files. With reference to FIGS. 4 and 5, a preferred embodiment is now described.

The method steps (S502 to 5524) shown in FIG. 5 and described below can be implemented using functional blocks of the nodes shown in FIG. 4. The functional blocks can be implemented as either hardware blocks or software blocks as appropriate to achieve the functions described below in relation to the method steps of FIG. 5. FIG. 4 shows a schematic representation of a communications system of a preferred embodiment. The user terminal 104 comprises the CPU 302, network interface 326 and memory 328 as described above. The user terminal 104 connects to the network 106 using the network interface 326. Also connected to the network 106 is the user terminal 112 as described above and shown in FIG. 1. FIG. 4 also shows a Call Triggered Activation (CTA) service 402 comprising a front end service block 404, an authorizations database 406, a signing service block 408 and a tracking database 410. The CTA service 402 may be a network node of the communications system containing the front end service 404, authorizations database 406, signing service block 408 and tracking database 410 as shown in FIG. 4. Alternatively, the elements of the CTA service 402 may be distributed across the communications system on different nodes. The front end service block 404 is used to connect the CTA service 402 to the network 106. The front end service block 404 and the signing service block 408 may be implemented in the CTA service 402 as hardware or software modules as would be appreciated by a person skilled in the art.

At step S502 a communication event commences at the user terminal 104. For example, the client 108 running on the CPU 302 of the user terminal 104 may receive an incoming call from user terminal 112 using the P2P communications system.

In step S504 the client 108 determines that in order to process the incoming call a particular feature is required to be enabled. As described above the feature may be stored in the memory 328 of the user terminal 104. In this case, the feature required by the incoming call may be for example a particular version of a codec for decoding the data of the incoming call. In alternative embodiments, the feature may be stored on a server of the communications system. In these alternative embodiments the feature may be used by the user terminal to process data of the communication event so long as the user terminal can provide a valid certificate to the server storing the feature. For example, in these alternative embodiments, the feature stored on the server may be a server supported session such as Multiparty Video or Screen Sharing, wherein the presentation of a valid certificate for use of the feature allows the user terminal to use the server supported session. In a multiparty voice conference, the feature might be an advanced feature (e.g. allowing remote muting of participants in the conference or full conference bridge functionality). If the required feature is enabled for use at the user terminal 104 then the feature is used to process the incoming call. However, if the feature is not enabled for use at the user terminal 104 then the feature cannot be used to process the incoming call (at least until the feature is enabled).

In step S506 it is determined that the feature is not enabled for use at the user terminal 104. In step S508 the client checks the relevant configuration files in the memory 328 to see if a certificate for enabling the require feature is stored there. The configuration files may additionally be stored at a backend service of the communications system, such that the configuration files can be reinstalled on the user terminal if necessary, e.g. if the certificates are lost from the memory 328 of the user terminal 104.

If a certificate authorizing the enablement of the required feature for the communication event is found in step S508, then in step S510 the certificate is retrieved from the memory 328 of the user terminal 104.

Figure 6:
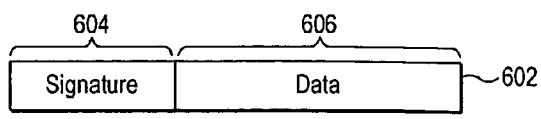
FIG. 6 shows a diagrammatical representation of a certificate.

FIG. 6 shows a diagrammatical representation of a certificate 602 according to a preferred embodiment. The certificate 602 comprises a signature portion 604 and a data portion 606. The signature portion 604 allows the certificate to be signed to verify the authenticity of the certificate. The certificate may for example be signed by including a specific key in the signature portion 604 to signify that the certificate is authentic. Maintaining a secure system is of particular importance when the communications system is a P2P communications system in which calls can be established without the involvement of central servers in the system. The use of keys in the signature portion 604 of the certificate helps to ensure the security of the communications system. For example, a public/private key system can be used as would be known to a person skilled in the art in order to ensure the security of the certificates.

The data portion 606 of the certificate 602 can contain data allowing the certificate to be used to enable specific features on specific user terminals and/or for specific users. For this purpose the data portion 606 comprises:

an identifier of a feature that is to be enabled using the certificate, for example this could identify a specific codec, or a server supported session, that is to be enabled;

an identifier unique to the user terminal 104, or unique to the user 102, or unique to the combination of the user terminal 104 and the user 102 that is requiring the enablement of the feature; and parameters related to the specific feature being enabled, for example the codec type of the codec being enabled.

Returning to FIGS. 4 and 5, following step S510 is an optional step S512 of verifying the certificate at the user terminal 104. The verification of the certificate in step 5512 may be carried out by the client 108. In step S512 the data portion 606 of the certificate may be checked to verify that the certificate relates to the particular feature required in the communication event. This can be achieved by checking that the identifier of the required feature is present in the data portion 606 of the certificate. Also in step S512 the validity of the certificate signature may be verified. This is achieved using the signature in the signature portion 604 of the certificate and a public key stored in the client 108 corresponding to the specific feature being enabled. Also in step S512 parameters in the data portion 606 of the certificate may be checked to verify that they are the parameters required to enable the required feature. For example, it is verified that the certificate relates to the correct codec type and codec version for the communication event. Also in step S512 it may be verified that the user terminal 104 and/or the user 102 correspond to the identifier in the data portion 606 of the certificate that is unique to a user terminal, or unique to a user, or unique to the combination of a user terminal and a user.

If any of the verifications in step S512 do not succeed then the certificate is not valid for enabling the required feature at the user terminal. Therefore the certificate cannot be used to enable the feature for use at the user terminal. If the certificate fails at least one of the verifications of step S512 then the user terminal can attempt to retrieve a valid certificate from the CTA service 402 using the method described below in relation to steps S516 to S524.

However, if all of the verifications of step S512 succeed, or alternatively, if step S512 is omitted from the method, then in step S514 the feature is enabled for use at the user terminal 104 and is used to process data of the communication event. In this way a call can proceed using the now-enabled feature. Where for example the required feature is a version of a codec, then the required version of the codec can be used to decode incoming data of a call and to encode outgoing data of the call. For example, the feature may be the latest version of a video codec, whereby the data in the communication event will be processed most optimally if that specific version of the video codec is used. Using the specific version of the video codec can result in better quality of communication and better user-experience.

Returning to step S508, if it is determined that the certificate is not stored at the user terminal 104 then the user terminal automatically attempts to retrieve the required certificate from the CTA service 402 to encode the required feature. Alternatively, as described above, if a certificate is found in the memory 328 of the user terminal 104 but that certificate does not pass the verifications of step S512 (because, for example, the certificate is signed with an invalid key or the parameters in the data portion 606 of the certificate do not match the current system) or that certificate cannot be used to enable the required feature for some other reason then the user terminal 104 automatically attempts to retrieve the required certificate from the CTA service 402 to enable the required feature. As described above the CTA service 402 may be a network node of the communications system, such as a dedicated server or peer node.

In step S516 the client 108 sends a request to enable the required feature to the front end service block 404 of the CTA service 402. The front end service block 404 may be a server in the communications system. The request includes verification data which comprises an identifier of the required feature and an identifier of at least one of the user 102 and the user terminal 104.

The front end service block 404 receives the request from the client 108 over the network 106. Step S518 is an optional step in which tracking data is sent from the front end service block 404 to the tracking database 410. The tracking data is written into the tracking database 410. The tracking data may include an identifier of the feature identified in the request and an identifier of at least one of the user and the user terminal identified in the request. This allows the software provider to track the requests to enable particular features that are received from user terminals in the communications system. In this way, the software provider can keep a record of how often particular features are requested and used. This information can be used for billing purposes where a user is required to pay for the use of a feature. A feature can be enabled on a temporary basis, for example for a predetermined amount of time or for a particular communication event or set of communication events. In that case, a user may be billed an amount of money for the use of the feature that is dependent upon the duration, or the number of communication events, for which the feature is enabled. Alternatively, a feature may be enabled on a permanent basis, i.e. indefinitely. It can be useful to track the use of a feature in the tracking database 410 for purposes other than billing. For example, this allows the software provider to see how popular certain features are with users of the communications system. This information can be used by the software provider to determine how to improve or add to existing features in the communications system.

The front end service block 404 forwards the request to the signing service block 408. In step S520 the signing service block 408 determines whether the use of the feature is authorized. The authorizations database 406 stores information regarding whether particular users or user terminals are allowed to enable certain features. The signing service block 408 determines whether the feature should be authorized in step S520 based on: (i) data in the authorizations database 406; (ii) the identifier of the feature in the verification data of the request; and (iii) the identifier of either the user terminal or the user in the verification data of the request to.

If it is found that the user 102 or the user terminal 104 is not authorized to enable the required feature then in step S522 the process ends without a certificate being sent to the user terminal 104. Therefore the user terminal will not obtain a certificate enabling the use of the required feature. Therefore the required feature cannot be used in the communication event. This may mean that the communication event cannot continue. Alternatively, it may mean that the communication event can continue but with a reduced performance, for example an older version of a requested codec may be used. One reason for not authorizing the use of the feature is if the service provider requires payment in order to allow a user to use a feature and no such payment has been received from the user. Another reason for not authorizing the use of the feature is if a certain level of system resources (e.g. processing power or memory) is required at the user terminal to implement the feature and it is determined that the user terminal 104 does not possess the required level of resources. For example, a high level video codec might not be suitable for the processing power of a mobile phone, so that if user terminal 104 is a mobile phone the feature might not be authorized for use on that user terminal.

If it is found in step S520 that the user 102 or the user terminal 104 (or the combination of the user 102 and the user terminal 104) is authorized to enable the required feature then the signature portion 604 of a certificate enabling the use of the feature at the user terminal is signed with a specific key. In step S524 the front end service block 404 sends a response comprising the signed certificate to the user terminal 104 over the network 106. The certificate is received by the user terminal 104 via the network interface 326. The certificate can be stored in the memory 328 of the user terminal 104.

As described above, the certificate can specify that the feature is enabled for use at a specific user terminal, or that the feature is enabled for use by a specific user, or that the feature is enabled for use by a specific user on a specific user terminal. In this way, the feature can be enabled in a per device or a per user manner (or in a per user using a particular device manner). In any of these events, the certificate can enable the use of a feature at the user terminal 104 for processing data in the communication event.

After step S524, the process passes to the optional step S512 of verifying the certificate at the user terminal as described above, before the feature is used in the communication event in step S514 as described above.

Where the certificate is retrieved from the CTA service 402 by sending a request to the front end service block 404 as described above in step S516, the data in the data portion 606 of the certificate can be time stamped and activated for a predetermined time for the call. The call may be identified in the data portion 606 of the certificate by a call identifier and a timestamp present in the verification data included in the request sent from the client 108 to the front end service block 404. This allows the certificate to enable the feature on a temporary basis for a particular time, or for a particular call.

If the validity of the certificate expires (for example when the time stamp in the data portion 606 of the certificate indicates that the certificate is older than a threshold age) or if the certificate contains errors or does not enable the feature for some other reason, the client 108 does not store the certificate and the feature is not used in the communication event. However, if the feature is required again by the communication event, or a different communication event, then the process shown in FIG. 5 can start again from step S5504.

The process shown in FIG. 5 can occur when the user 102 of the user terminal 104 is a called user in a communication event. Alternatively, the process can occur when the user 102 of the user terminal 104 is a caller in a communication event.

An example of how the method of a preferred embodiment is implemented is now described in which a particular video codec is enabled on a per device basis. On receiving a request for a video call that uses the particular video codec the client 108 checks the configuration file and tries to find a corresponding certificate for this particular video codec.

After finding the certificate, data is received from the configuration file and the signature of the data is checked to make sure that it has been signed with the correct key for the particular video codec. After that, the unique user terminal identifier is retrieved from the certificate and the client checks if it matches the unique user terminal identifier of user terminal.

If the verification succeeds, the video codec is marked enabled and call setup succeeds.

If the verification fails, video codec activation is attempted, by sending a request to the CTA service 402, whereby the client provides activation verification data in the request to the CTA service 402. For the example of a request for activation for the user terminal (i.e. on a per device basis) this activation verification data comprises a unique identifier of the user terminal 104.

The CTA service 402 writes the information to the tracking database, including the unique user terminal identifier, client's IP address, and any other data that is required to track the use of the particular video codec.

If the user terminal 104 is authorised to enable the feature then the data is signed and then sent back to the client 108 in the form of a certificate.

The client repeats the verification process for the new certificate, and if this succeeds, the certificate is written to the configuration file and the feature is enabled.

In case the activation fails, for example due to database error or any other problem the feature remains disabled and the certificate is removed from the configuration file (if it has been stored in the configuration file).

While this invention has been particularly shown and described with reference to preferred embodiments, it will be understood to those skilled in the art that various changes in form and detail may be made without departing from the scope of the invention as defined by the appendant claims. For example, it will be appreciated that embodiments of the invention described herein can be employed in an IM system, a VoIP system, a video call system or any combination thereof. The user terminals (104, 112) on which the communication client is running can connect to the communication network 106 via intermediate networks (such as mobile networks, WLAN networks or corporate networks).

What is claimed is:

1. A method comprising:
   determining, responsive to a communication event being initiated over a peer-to-peer (P2P) communications system, by a user terminal of the P2P communications system that the communication event requires a feature to be enabled and activated for use at the user terminal for processing data of the communication event;
   determining, during the communication event, that the feature required by the communication event is not enabled for use by the user terminal, the feature comprising a particular version of a video codec usable for processing the data of the communication event;

responsive to determining that the feature is not enabled, automatically retrieving a certificate configured to enable the use of the feature by the user terminal; and using the feature at the user terminal to process the data of the communication event.

2. The method of claim 1 wherein the retrieving a certificate comprises:

transmitting a request to enable the use of the feature at the user terminal, over the communications system, to a node of the communications system effective to cause the node to determine, based on data contained in the request, whether use of the feature at the user terminal is authorized; and if the use of the feature at the user terminal is authorized, receiving a certificate at the user terminal over the communications system from the node.

3. The method of claim 2 wherein the data contained in the request is verification data comprising an identifier of the feature and at least one of an identifier of the user terminal and an identifier of a user of the user terminal.

4. The method of claim 3 wherein transmitting the request is effective to further cause the node to:

use an authorizations database at the node to check whether the at least one of the user terminal and the user identified in the verification data is authorized to enable the feature identified in the verification data; and sign the certificate at the node if the at least one of the user terminal and the user identified in the verification data is authorized to enable the feature identified in the verification data.

5. The method of claim 2 wherein transmitting the request is effective to further cause the node to write tracking data to a tracking database, the tracking data including an identifier of the feature and an identifier of at least one of the user terminal and a user of the user terminal.

6. The method of claim 1 wherein the retrieving a certificate comprises retrieving the certificate from a memory of the user terminal.

7. The method of claim 1 wherein the certificate comprises:

a signature authenticating the certificate; and data comprising:

an identifier of the feature;

an identifier of at least one of the user terminal and a user of the user terminal; and one or more parameters relating to the feature.

8. The method of claim 7 further comprising at least one of:

verifying a validity of the signature;

verifying that the identifier of the feature relates to the feature required in the communication event;

verifying that the identifier of the at least one of the user terminal and the user of the user terminal relates to a respective at least one of the user terminal and the user of the user terminal in the communication event; or verifying that the one or more parameters relate to the feature required in the communication event.

9. The method of claim 1 wherein the certificate enables the use of the feature at the user terminal permanently.

10. The method of claim 1 wherein the certificate enables the use of the feature at the user terminal temporarily.

11. The method of claim 1 wherein the communication event is one of receiving an incoming call at the user terminal over the communications system or placing an outgoing call at the user terminal over the communications system.

12. The method of claim 1 wherein the feature is stored at the user terminal.

13. The method of claim 1 wherein the feature is stored at a server of the communications system.

14. A peer-to-peer (P2P) communications system comprising a user terminal, the user terminal comprising:

means for determining, responsive to a communication event being initiated over the P2P communications system, at the user terminal that the communication event requires a feature to be enabled and activated for processing data of the communication event, the feature comprising a codec usable for processing the data of the communication event;

means for determining that the feature required by the communication event is not enabled for use at the user terminal;

means for automatically retrieving a certificate from a peer node of the P2P communications system responsive to determining that the feature is not enabled for use at the user terminal, the certificate configured to enable the use of the feature at the user terminal; and means for using the feature at the user terminal to process data of the communication event.

15. The system of claim 14 wherein the user terminal further comprises:

means for transmitting a request to enable the use of the feature at the user terminal, over the communications system, to a node of the communications system effective to cause the node to determine, based on data contained in the request, whether use of the feature at the user terminal is authorized; and means for receiving the certificate at the user terminal over the communications system if the use of the feature at the user terminal is authorized.

16. The system of claim 14 wherein the means for retrieving a certificate further comprises means for retrieving the certificate from a memory of the user terminal.

17. The system of claim 14 wherein the certificate comprises:

a signature authenticating the certificate; and data comprising:

an identifier of the feature;

an identifier of at least one of the user terminal and a user of the user terminal; and one or more parameters relating to the feature.

18. The system of claim 14 wherein the certificate enables the use of the feature at the user terminal permanently.

19. The system of claim 14 wherein the certificate enables the use of the feature at the user terminal temporarily.

* * * * *

UNITED STATES PATENT AND TRADEMARK OFFICE
CERTIFICATE OF CORRECTION

PATENT NO. : 8,627,439 B2  
APPLICATION NO. : 12/462204  
DATED : January 7, 2014  
INVENTOR(S) : Marek Laasik Page 1 of 1

It is certified that error appears in the above-identified patent and that said Letters Patent is hereby corrected as shown below:

On the Title Page, Item (73), please correct the Assignee from "Microsoft Corporation, Redmond, WA (US)" to "Skype, Dublin, (IE)"

Signed and Sealed this
Tenth Day of February, 2015

Michelle K. Lee
*Deputy Director of the United States Patent and Trademark Office*